United States Patent Office 3,813,361
Patented May 28, 1974

3,813,361
NON-DISCOLORING THERMOSETTING POLY-
URETHANE LACQUER
Marina N. Gillis, Morrisville, Pa., and Michael P. Mazzeo,
Hightstown, N.J., assignors to Thiokol Chemical
Corporation, Bristol, Pa.
No Drawing. Filed Oct. 16, 1972, Ser. No. 298,173
Int. Cl. C08g 51/24, 51/44, 51/34
U.S. Cl. 260—29.2 TN				14 Claims

ABSTRACT OF THE DISCLOSURE

A thermosetting polyurethane lacquer composition is disclosed comprising (a) a polyurethane, which is the reaction product of at least one polyol and a diisocyanate, and which has been chain extended, (b) a cross-linking amount of dimethylolurea or dimethylolethyleneurea, (c) suitable solvents, and (d) .003–.03 parts of phosphoric acid per 100 parts of polyurethane solvents.

BACKGROUND OF THE INVENTION

Field of the invention

This invention is related to polyurethane lacquers for coating applications. In particular, it is related to a lacquer with relatively stable lacquer viscosity on long term storage which is capable of depositing a polyurethane film with the characteristically good properties of urethanes during a relatively short heat treatment intended to drive off the solvents. Moreover, it is related to an improved lacquer which contains a critical amount of phosphoric acid plus a heat-activatable cross-linking agent which results in a thermosetting coating with a greatly increased softening temperature.

Description of the prior art

The use of dimethylolurea and dimethylolethyleneurea to crosslink a polyurethane has been disclosed in British Pat. 1,210,691. However, the use of phosphoric acid in such a system, especially in the critical proportions of this invention, has not been heretofore disclosed.

SUMMARY OF THE INVENTION

It is an object of this invention to produce an improved polyurethane lacquer by the incorporation of a critical amount of phosphoric acid together with dimethylolurea or dimethylolethyleneurea to crosslink a polyol-diisocyanate-based polyurethane lacquer.

DESCRIPTION OF THE PREFERRED EMBODIMENTS

The polyurethane prepolymer suitable for use in this invention can be prepared by known processes from either a hydroxy-terminated polyol or a mixture of said polyols together with a diisocyanate.

A number of different compounds containing hydroxyl groups reactive with —NCO groups are suitable for use as polyols for the preparation of the prepolymers which are used in this invention. Preferred polyols are those having a molecular weight of from 250 to 10,000 most preferred are those having a molecular weight of from 600 to 5000. Examples of such compounds include polyether polyols, such as, for example, those which are obtained by anionic polymerization, copolymerization and block copolymerization of alkylene oxides, such as, for example, ethylene oxide, propylene oxide or butylene oxide with bi-functional alcohols such as, for example, butane-1,4-diol, or by cationic polymerization or copolymerization of cyclic ethers, such as, for example, tetrahydrofuran, ethylene oxide or propylene oxide with acid catalysts, such as, for example, boron trifluoride etherate, or by polycondensation of glycols which are polycondensable with the elimination of water, such as, for example, hexane-1,6-diol, in the presence of acid etherification catalysts, such as, for example, p-toluene sulphonic acid.

Polythioether polyols, such as, for example the polycondensation products of thiodiglycol with itself or with polyols, such as, for example, hexane-1,6-diol, triethylene glycol, and 2,2-dimethyl-propane-1,3-diol may also be used. Polyacetals, particularly the polycondensation products of formaldehyde and polyols, such as, for example, diethylene glycol, trimethylene glycol, butane-1,4-diol, or hexane-1,6-diol are also suitable.

Polyester polyols, such as, for example, the condensation products of polycarboxylic acids and polyols, for example, adipic acid, phthalic acid, tetrahydrophthalic acid, hexahydrophthalic acid and endomethylene tetrahydrophthalic acid with ethylene glycol, butane-1,4-diol, diethylene glycol, triethylene glycol, hexane-1,6-diol, or 2,2-dimethylpropane-1,3-diol, as well as polycarbonates of the above mentioned polyols or polymerization products of lactones such as ε-caprolactone are also suitable.

A preferred polyol suitable for use herein is a hydroxy-terminated condensation polymer of ethylene-propylene (80–20 mol percent) glycol and adipic acid of varying molecular weights. The molecular weight of these polyols may be between about 600 to 3000 with these molecular weights being obtained either by a single polyol or by blends of varying molecular weight polyols. The preferred molecular weight of these polyols is between about 900 to 1600.

The polyisocyanates contemplated for use according to the process of the invention are those isocyanates which contain two —NCO groups per molecule and may be aliphatic or aromatic isocyanates. The polyisocyanates may also be substituted by various substituents, such as, for example, halogen atoms, particularly chlorine, bromine, fluorine and iodine, or alkoxyl or nitro groups. Some suitable polyisocyanates suitable for use according to the process of the invention are:

1-chlorobenzyl-2,4-diisocyanate,
1-nitrobenzyl-2,4-diisocyanate,
1,3-dichlorobenzyl-4,6-diisocyanate,
1,4-dichlorobenzyl-2,5-diisocyanate,
1-chloro-4-methoxybenzyl-2,5-diisocyanate,
1-methoxybenzyl-2,4-diisocyanate,
1-methyl-4-methoxybenzyl-2,5-diisocyanate,
1-ethoxybenzyl-2,4-diisocyanate,
1,3-dimethoxybenzyl-4,6-diisocyanate,
1,4-dimethoxybenzyl-2,5-diisocyanate,
1-propoxybenzyl-2,4-diisocyanate,
1-isobutoxybenzyl-2,4-diisocyanate,
1,4-diethoxybenzyl-2,5-diisocyanate,
toluene-2,4-diisocyanate,
toluene-2,6-diisocyanate,
diphenylether-2,4-diisocyanate,
naphthalene-1,4-diisocyanate,
1,1'-dinaphthalene-2,2'-diisocyanate,
biphenyl-2,4-diisocyanate,
3,3'-dimethylbiphenyl-4,4'-diisocyanate,
3,3'-dimethoxybiphenyl-4,4'-diisocyanate,
diphenylmethane-4,4'-diisocyanate,
diphenylmethane-2,4'-diisocyanate,
diphenylmethane-2,2'-diisocyanate,
3,3'-dimethoxydiphenylmethane-4,4'-diisocyanate,
3,3'-dichlorodiphenyldimethylmethane-4,4'-diisocyanate,
benzophenone, -3,3'-diisocyanate.

Further examples of such compounds include ethylene diisocyanate,
propylene diisocyanate,
butylene diisocyanate,
pentylene diisocyanate,
methylbutylene diisocyanate, tetramethylene diisocyanate,
pentamethylene diisocyanate,
hexamethylene diisocyanate,
dipropyldiisocyanato ether,
heptamethylene diisocyanate,
2,2-dimethylpentylene diisocyanate,
3-methoxy-hexamethylene diisocyanate,
otamethylene diisocyanate,
2,2,4-trimethylpentylene diisocyanate,
3-butoxyhexamethylene diisocyanate,
1,3-dimethyl benzene diisocyanate,
1,4-dimethyl benzene diisocyanate,
1,2-dimethylcyclohexane diisocyanate,
1,4-dimethylcyclohexane diisocyanate,
1,4-diethylbenzene diisocyanate,
1,4-dimethylnaphthalene diisocyanate,
1,5-dimethylnaphthalene diisocyanate,
1-methylisocyanate-2-n-propylisocyanate,
cyclohexane-1,3-diisocyanate,
cyclohexane-1,4-diisocyanate,
1-methylcyclohexane-2,4-diisocyanate,
1-methylcyclohexane-2,2-diisocyanate,
1-ethylcyclohexane-2,4-diisocyanate,
dicyclohexylmethane-4,4'-diisocyanate,
dicyclohexylmethane-4,4'-diisocyanate,
dicyclohexyldimethylmethane-4,4'-diisocyanate,
2,2-dimethyldicyclohexylmethane-4,4'-diisocyanate,
3,3',5,5'-tetramethyldicyclohexylmethane-4,4'-diisocyanate,
4-phenylisocyanatemethylisocyanate,
3-nitrotriphenylmethane-4,4'-diisocyanate,
pyrene-3,8-diisocyanate,
chrysene-2,8-diisocyanate.

A preferred aliphatic diisocyanate suitable for use herein is 4,4'-methylenebis(cyclohexylisocyanate),

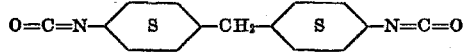

sold under the trademark Hylene W by E. I. du Pont. The compound exists as a blend of isomeric forms involving cis- and trans-configurations of the isocyanate group relative to the cyclohexyl ring. A preferred aromatic diisocyanate is tolylene diisocyanate.

The NCO/OH ratio in the prepolymer should be maintained at about 1.6/1-2/1 to produce a suitable NCO-terminated material.

The isocyanate-terminated prepolymer, after dilution in a suitable solvent or solvents, is chain extended at a stoichiometry of about 1.05 equivalents isocyanate/equivalent amine or diol. The chain extension is preformed by reacting bifunctional chain lengthening agents to yield a substantially linear elastomeric polyurethane which is soluble in highly polar solvents. The chain lengthening agents should have a molecular weight of about 18 to about 500, preferably 32 to 350. Suitable agents for use herein, either individually or as mixtures, are water, ethylene glycol, propylene glycol, butane diol-(1,4), hexane-diol-(1,6), hydroquinone-bis-β-hydroxyethylether, p-xylylene glycol, and diamines such as ethylene diamine, 1,2-propylene diamine, 1,3-propylene diamine, 1,4-tetramethylene diamine, 1,6-hexamethylene diamine, 2,2,4-trimethylhexane diamine-(1,6), 1-methylcyclohexane-2,4-diamine, 1-amino-3-aminomethyl-3,5,5-trimethylcyclohexane (isophorone diamine), 4,4'-diamino-di-cyclohexylmethane, bis-(aminopropyl) piperazine, or aromatic diprimary amines such as 4,4'-diamino-diphenylmethane, 4,4'-diamino-diphenylsulphide, 4,4'-diphenylether, 1-methyl-2,4-diaminobenzene or araliphatic diprimary diamines such as m-xylylene diamine, p-xylylenediamine, α,α,α',α'-tetramethyl-p-xylylenediamine, 1,3-bis-(β-amino-isopropyl)-benzene, and hydrazides such as carbodihydrazide, oxalic acid dihydrazide, malonic acid dihydrazide, succinic acid dihydrazide, and hydracrylic acid dihydrazide, p-phenylenediacetic acid dihydrazide, hydroquinone diacetic acid dihydrazide, N-methyl-bis-(propionic acid hydrazide), N,N'-piperazinc-bis-(propionic acid hydrazide), isophthalic acid dihydrazide, m- and p-cyclohexane dicarboxylic acid hydrazide (cis/trans), hexamethylene-bis-semicarbazide, aminoacetic acid hydrazide, and in addition, hydrazine, e.g. also in the form of hydrazine hydrate, as well as dihydrazines such as N,N'-diaminopiperazine.

Secondary diamines can also be used, preferably those with symmetrical structure, such as piperazine or 2,5-dimethylpiperazine.

Preferred chain lengthening agents are ethylene diamine, isophorone diamine, and butanediol. When butanediol, or any other diol, is used it is preferable to use it in conjunction with a diamine, though the diol could be used by itself. The solvents which are selected for the chain extension may advantageously be chosen such that the final product of the chain extension will be the lacquer at the desired percent solids.

To the chain-extended lacquer of above is then added a cross linking amount of a suitable cross linking agent, i.e. about 0.5 to 5 parts by weight per 100 parts of lacquer, and the necessary critical amount of the phosphoric acid. A suitable cross linking agent could be dimethylolurea which may react with the urea group hydrogen atom eliminating water and forming a cross-link, as shown below:

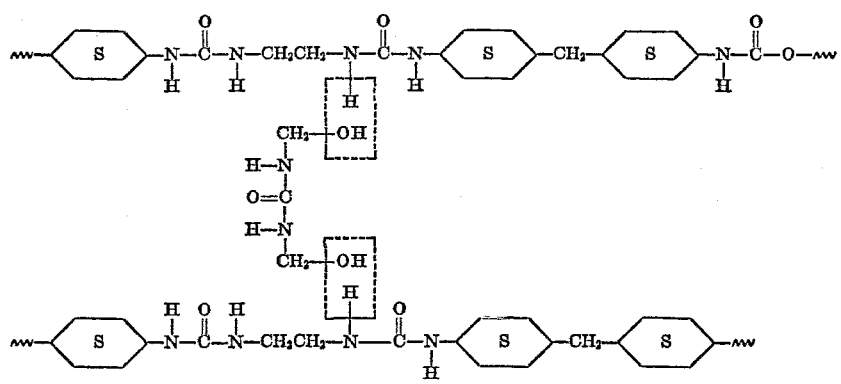

Also suitable for use herein as the crosslinking agent is dimethylolethyleneurea.

The unexpected feature of this invention is the use of small but critical amounts of an acid, such as phosphoric acid, to catalyze the above crosslinking reaction. The phosphoric acid must be used from about .003 to .03 parts per 100 parts of lacquer (prepolymer plus solvents). Below about .003 parts, there is insufficient acid present to both effectively catalyze the crosslinking reaction and to provide solution of the dimethylolurea in the lacquer; above about .03 parts, the acid deteriorates, the properties of a film cast from the lacquer. This is especially true when the lacquer has undergone storage. This critical concentration is substantiated by the examples below.

The solvents which are suitable for use in preparing the lacquer include, for example, the following: toluene, methyl Cellosolve, dimethyl formamide, methanol, isopropanol, and methylethylketone. A small amount of water may also be present. These may be used in combinations such as, but not limited to: toluene and methyl Cellosolve; dimethyl formamide and methanol; methyl Cellosolve; dimethyl formamide; and methyl Cellosolve, methanol, and toluene. The last solvent combination is preferred.

To the finished polyurethane lacquer may be added antiblocking agents such as silicone oils to improve the release properties of a finished film, as well as various pigments or other additives.

The following examples exhibit the novel composition and the critical proportions of the phosphoric acid.

EXAMPLE 1

To a three-liter reactor equipped with stirrer, heating mantle, $N_2$ inlet, thermometer, and water-cooled condenser were added 401.1 grams of a hydroxy-terminated condensation polymer of ethylene-propylene (80–20 mol percent) glycol and adipic acid of average molecular weight of 950 and 248.9 grams of the same polymer but of average molecular weight of 2500. The blend had an average molecular weight of about 1550. Both polyols were premelted at 65° C. The reactor containing the polyols was then heated to 100° C. under $N_2$, and then vacuum-dried one-half hour at 60 mm. Hg and 100° C. to remove residual moisture. The vacuum was then broken, a moderate $N_2$ sweep was re-introduced, and the reactor was cooled to about 70° C. Then .003 weight percent (.027 grams) stannous octoate was introduced. Next, 257.4 g. Hylene W was added and heat was applied to 80° C., where it was maintained for 5 hours. The reaction was then diluted to 77% solids with 271.0 grams of moisture-free toluene. The reaction mixture was then sampled for NCO analysis while cooling to room temperature. Based upon the isocyanate analysis, the prepolymer was chain-extended with ethylene diamine to provide a chain-extension stoichiometry of 1.05 equiv. NCO/equivalent amine, the ethylene diamine being dissolved in ~972.0 grams methyl Cellosolve and ~389 grams methanol. The chain-extender solution was added rapidly, in <1 minute, and the reaction mixture was allowed to stir for about 10 minutes. An exotherm of about 10° C., from about 30° C. to 40° C., was observed. The solids content of the lacquer was 35% and the cosolvent composition in parts by weight, was 16 toluene, 60 methyl Cellosolve, and 24 methanol.

The lacquer was then post-heated at reflux (72–78° C.) for 1 hour, cooled to 40° C. and discharged.

To 100 parts of this stable polyurethane lacquer were added 1.5 parts dimethylolurea and .01 parts phosphoric acid. The acid must be present for the dimethylolurea to dissolve in the lacquer. The mixture was blended until a homogeneous solution was obtained. The complete solution of dimethylolurea was facilitated by preheating the lacquer to 65° C., and using a high-shear agitator. The final lacquer product was colorless, and clear.

To perform physical tests on the lacquer, it was cast into a film. This was done by warming the lacquer to about 60° C. and then applying it with a doctor blade to glossy release paper.

The lacquer coating was dried for 1 hour at 90° C., in order to remove the solvents and deposit a clear, colorless, and continuous polyurethane film. Dry thickness was in the range of .004 to .007 inches.

At this point, the film, still attached to the release paper was put into an oven at 140° C. for 10 minutes. The purpose of the brief exposure to high temperature was to effect the crosslinking reaction between the dimethylolurea and the polyurethane chains. The final crosslinked film was subsequently vacuum-dried overnight at room temperature to remove any trace amounts of solvent which could affect the properties.

Softening temperature of the film was measured by laying a narrow strip of the film on a Kofler-Heizbank Hotstage melting apparatus, and noting the temperature at which the film softened. The lower number of the softening range represents the first onset of softening: stretching of the film. The upper number is the temperature at which the film was fused to the Hotstage. The other properties were determined under standard procedures.

Properties of the cast film were as follows:

| | |
|---|---|
| Utimate tensile, p.s.i. | 3970 |
| Ultimate elongation, percent | 275 |
| 100% modulus, p.s.i. | 990 |
| 200% modulus, p.s.i. | 1995 |
| Tear (die), p.l.i. | 215 |
| Softening range, ° C. | 205–220 |

Brookfield viscosity of the lacquer at ambient temperature was 210 poises.

EXAMPLE 2

The basic procedure of Example 1, up to the addition of the diemthylol urea and the phosphoric acid, was repeated. Then varying amounts of these chemicals were added to determine the lowest level of phosphoric acid which is suitable herein. As stated previously, the acid performs two functions in producing a satisfactory lacquer. First, there had to be sufficient acid to cause the dissolution of the dimethylol urea (DMU) in the lacquer or else the DMU settled out. Secondly, there had to be sufficient acid to effectively catalyze the crosslinking reaction.

As can be seen from Table I below, until about .003 parts of acids were added to the lacquer plus DMU, the DMU remained essentially undissolved, thereby producing a completely unsatisfactory lacquer. At about .003 parts of acid, the DMU dissolved.

To show the effectiveness of this lower limit of acid to effectively catalyze the crosslinking reaction, the softening temperature and the insolubility in dimethyl formamide were determined. The uncrosslinked material showed a softening range of 150–161° C. as compared to the crosslinked material with .003 parts acid of 205–211° C. The insolubility of the film in dimethylformamide (DMF) is another measure of the crosslinking, i.e., the more crosslinked, the more insoluble. This test was preformed by putting 5 g. of film into 95 g. of DMF and noting its appearance.

TABLE I.—RESULTS OF EXAMPLE 2

| | | | | | | |
|---|---|---|---|---|---|---|
| Parts of DMU/100 pts. lacquer | None | 1.5 | 1.5 | 1.5 | 1.5 | 1.5. |
| Parts of $H_3PO_4$/100 pts. lacquer | do | None | .001 | .002 | .003 | .010. |
| Lacquer appearance | Clear | DMU, undissolved. | DMU, mostly undissolved. | DMU, partly dissolved. | DMU, dissolved | DMU, dissolved. |
| Film properties: | | | | | | |
| Ultimate tensile, p.s.i. | 5,040 | | | | 3,770 | 3,175. |
| Ultimate elongation, percent | 505 | | | | 275 | 210. |
| 100% modulus, p.s.i. | 590 | Lacquer unacceptable. | Lacquer unacceptable. | Lacquer unacceptable. | 870 | 1,005. |
| 200% modulus, p.s.i. | 910 | | | | 1,905 | 2,540. |
| 300% modulus, p.s.i. | 1,475 | | | | | |
| 400% modulus, p.s.i. | 2,555 | | | | | |
| Tear (Die C), p.l.i. | 440 | | | | 225 | 120. |
| Softening range, ° C. | 150–161 | | | | 205–211 | 208–219. |
| Insolubility in dimethyl formamide* | D | | | | B | A. |

*NOTES:
D=Completely dissolved.
C=Gelatinous fluid, where film and solvent cannot be differentiated.
B=Film swollen into a gel mass.
A=Retained film form, insoluble.
DMU=dimethylol urea.

EXAMPLE 3

This example shows the effect of too much acid on the viscosity and physical properties of a film similar to the lacquer of Example 1, but without any dimethylolurea. As can be seen from Table II, with excess acid, the properties deteriorate tremendously upon storage of only 50 days, thereby proving the criticality of the upper limit of phosphoric acid.

TABLE II.—RESULTS OF EXAMPLE 3

|  | Lacquer viscosity at room temp., poises | Tensile | Elong. | \multicolumn{5}{c}{Physical properties of film cast from aged lacquer, modulus—} | Tear |
| --- | --- | --- | --- | --- | --- | --- | --- | --- | --- |
|  |  |  |  | 100% | 200% | 300% | 400% | 500% |  |
| I. Control without acid: |  |  |  |  |  |  |  |  |  |
| Original | 211 | 5,740 | 570 | 680 | 930 | 1,400 | 2,390 | 2,970 | 481 |
| Aged 22 days | 210 | 5,860 | 590 | 620 | 850 | 1,280 | 2,230 | 3,650 | 465 |
| Aged 50 days | 195 | 4,980 | 515 | 610 | 840 | 1,280 | 2,090 | 3,510 | 400 |
| II. 0.01% H$_3$PO$_4$: |  |  |  |  |  |  |  |  |  |
| Original | 188 | 6,730 | 600 | 720 | 980 | 1,490 | 2,550 | 4,230 | 508 |
| Aged 22 days | 135 | 6,350 | 630 | 690 | 945 | 1,380 | 2,355 | 3,740 | 468 |
| Aged 50 days | 105 | 5,260 | 570 | 630 | 870 | 1,250 | 2,170 | 3,400 | 441 |
| III. 0.03% H$_3$PO$_4$: |  |  |  |  |  |  |  |  |  |
| Original | 170 | 6,250 | 600 | 700 | 950 | 1,470 | 2,500 | 4,170 | 473 |
| Aged 22 days | 125 | 5,840 | 610 | 680 | 905 | 1,360 | 2,280 | 3,700 | 409 |
| Aged 50 days | 93 | 3,810 | 540 | 610 | 810 | 1,170 | 1,870 | 2,940 | 376 |
| IV. 0.05% H$_3$PO$_4$: |  |  |  |  |  |  |  |  |  |
| Original | 151 | 5,600 | 645 | 680 | 930 | 1,360 | 2,210 | 3,530 | 442 |
| Aged 22 days | 20 | 2,990 | 640 | 610 | 800 | 1,050 | 1,470 | 2,010 | 298 |
| Aged 50 days | 10 | 960 | 345 | 580 | 710 | 840 |  |  | 165 |
| V. 0.10% H$_3$PO$_4$: |  |  |  |  |  |  |  |  |  |
| Original | 122 | 4,750 | 660 | 660 | 880 | 1,240 | 1,940 | 2,870 | 455 |
| Aged 22 days | 8.4 | 1,360 | 535 | 500 | 690 | 830 | 1,005 | 1,160 | 223 |
| Aged 50 days | 4.4 | 430 | 80 |  |  |  |  |  | 75 |

EXAMPLE 4

Two polyurethane lacquers were prepared as in Example 1, except for the following differences: the cosolvent composition was varied, and the dimethylol urea level was varied. Concentration of phosphoric acid was kept constant at .01 parts per 100 parts lacquer.

Evaluation of the lacquers followed the procedures of Examples 1 and 2. Insolubility in dimethyl formamide was measured at 10 pts. film in 90 pts. DMF.

Results were as shown in Table III along with comparative data for lacquer without DMU or acid. The crosslinking effectiveness of DMU, increasing with increased concentration of DMU at constant acid level, is amply illustrated by the following properties: film modulus, film insolubility, and high softening temperature. All these properties increase markedly with increased concentration of DMU.

EXAMPLE 5

To a 5-liter glass reactor equipped with stirrer, thermometer, N$_2$ inlet, heating mantle and water-cooled condenser was added 1597.6 grams of a molten blend of two polyols having identical composition, condensation copolymers of adipic acid and 80 mol percent ethylene-20 mol percent propylene glycol, but different molecular weights. Average molecular weight of the blend was 1065.0. The polyol blend was heated to 100° C. under a nitrogen blanket and then vacuum dried for 30 minutes at 100° C. and 60 mm. Hg pressure. The vacuum was released, the moderate nitrogen sweep was resumed and the reactor was cooled to 50° C. 684.8 grams of moisture-free dimethyl formamide containing .068 grams of 85% phosphoric acid were added and blended with the polyol blend to give a homogeneous solution. Then 456.8 grams of tolylene diisocyanate, Hylene TM (du Pont), was added and the reaction mixture was heated to 60° C. where it was maintained for 1½ hours. 25.35 grams of 1,4-butanediol were added as a partial chain extender, with the reactor immersed in a water bath to control the exotherm. The reaction mixture was then heated for an hour at 60° C., and then sampled for isocyanate analysis and cooled to ambient temperature. Based on the isocyanate analysis, the partly chain-extended prepolymer was further chain-extended with ethylene diamine at a stoichiometry of 1.02 equivalents isocyanate per equivalent amine, the ethylene diamine being dissolved in about 2276 grams dimethyl formamide, about 212 grams water, about 989 grams toluene and about 989 grams methylethylketone. The chain-extender solution was added rapidly, and a 5 to 10° C. exotherm to 40° C. was noted. The lacquer was stirred for 15 minutes, and then heated to 90° C. at which temperature the lacquer was post-heated for 1 hour. It was then cooled to 40° C. and discharged. Final percent solids of the lacquer was 29.1. The cosolvent composition in parts by weight was 57.5 dimethylformamide, 19.2 methylethylketone, 19.2 toluene, and 4.1 water.

To 100 parts of this stable thermoplastic polyurethane lacquer were then added .01 parts 85% phosphoric acid and 1.8 parts Aerotex Resin EU (American Cyanamid), a 50% solution of dimethylolethyleneurea. The formulated lacquer was blended for 15 minutes and the initial viscosity at ambient temperature was 205 poises.

Films were prepared and evaluated according to the procedure of Example 1 of both the crosslinked lacquer and an identical lacquer prior to the addition of the dimethylolethyleneurea and the acid. The comparison of the properties of these two films are shown in Table IV.

TABLE III.—RESULTS OF EXAMPLE 4

|  | 35% solids lacquer in 16 pts. toluene/84 methyl Cellosolve cosolvent blend | | | | | 35% solids lacquer in 16pts. toluene/60 methyl cellosolve/24 methanol cosolvent blend | | | |
| --- | --- | --- | --- | --- | --- | --- | --- | --- | --- |
| Parts of DMU/100 pts. lacquer | None | None | 0.7 | 1.5 | 3.0 | None | 0.3 | 0.7 | 1.5 |
| Parts of H$_3$PO$_4$/100 pts. lacquer | None | .01 | .01 | .01 | .01 | None | .01 | .01 | .01 |
| Film properties: |  |  |  |  |  |  |  |  |  |
| Ultimate tensile, p.s.i. | 5,850 | 5,250 | 2,730 | 1,910 | 2,220 | 5,620 | 4,190 | 3,620 | 3,720 |
| Ultimate elong., percent | 565 | 565 | 315 | 200 | 175 | 630 | 500 | 375 | 380 |
| 100% modulus, p.s.i. | 680 | 610 | 740 | 970 | 1,220 | ($^2$) | ($^2$) | ($^2$) | ($^2$) |
| 200% modulus, p.s.i. | 940 | 850 | 1,190 | 1,910 |  | 820 | 800 | 1,120 | 1,040 |
| 300% modulus, p.s.i. | 1,420 | 1,260 | 2,190 |  |  | 1,190 | 1,230 | 1,830 | 1,880 |
| 400% modulus, p.s.i. | 2,480 | 2,190 |  |  |  | 2,000 | 2,230 |  |  |
| Tear (Die C), p.l.i. | 430 | 475 | 255 | 205 | 122 | 455 | 400 | 355 | 315 |
| Softening range, ° C. | 120-170 | 120-170 | 219 | 239 | 263 | 176-177 | 180-208 | 225-228 | 238 |
| Insolubility in DMF $^1$ | D | C | A | A | A | D | B | A | A |

$^1$ NOTES:
A = Retained film form, insoluble.
B = Film swollen into a gel mass.
C = Gelatinous fluid, where film and solvent cannot be differentiated.
D = Completely dissolved.
$^2$ No data.

EXAMPLE 6

To a 3-liter glass reactor equipped with a mechanical stirrer, thermometer, $N_2$ inlet, heating mantle, and water-cooled condenser was added 355.0 grams of the polylactone Niax Polyol D-540 (Union Carbide). The polyol was heated to 100° C. under a nitrogen blanket and then vacuum-dried for 30 minutes at 100° C. and 60 mm. Hg pressure. The vacuum was released, the moderate nitrogen sweep was resumed, and the reactor was cooled to 70° C. 0.015 grams (.003 wt. percent) of stannous octoate catalyst was introduced by micro-syringe and blended into the polyol. Next, 142.7 grams of 4,4'-methylene-bis(cyclohexylisocyanate), Hylene W (du Pont), was added, and the reactants were heated to 80° C. The reaction temperature was maintained at 80° C. for 5 hours. The product prepolymer was diluted to 67% solids in moisture-free toluene, sampled for isocyanate analysis and cooled to 25° C. Based upon the isocyanate analysis, the prepolymer was chain-extended with a 50-50 mole percent blend of isophorone diamine and ethylene diamine, at a stoichiometry of 1.05 equivalents isocyanate per equivalent of amine, the diamines being dissolved in a cosolvent system containing about 512 g. methylethylketone, about 512 grams isopropanol and about 273 grams toluene. The chain-extending solution was added rapidly. A very slight exotherm was observed, typically an increase of about 3° C., from 25 to 28° C. The lacquer was stirred for twenty minutes and discharged. The final solids content of the lacquer was 25% and the cosolvent composition contained coequal parts of methylethylketone, toluene and isopropanol.

To 100 parts of this stable polyurethane lacquer were added .005 parts of 85% phosphoric acid and 1.8 parts Aerotex Resin EU (American Cyanamid), a 50% solution of dimethylolethyleneurea. The formulated lacquer was homogeneous and colorless. Its initial viscosity was 196 poises, measured at room temperature.

Films were prepared from (1) the crosslinked lacquer and (2) the same lacquer with the dimethylolethyleneurea and the acid, in accordance with the procedure of Example 1. The test results of these films were as shown in Table IV.

EXAMPLE 7

To a 5-liter glas reactor equipped with stirrer, thermometer, $N_2$ inlet, heating mantle and water-cooled condensor was added 498.1 grams of the polyether Niax Polyol PPG 1025 (Union Carbide). The polyol was heated to 100° C. under a nitrogen blanket and then vacuum-dried for 30 minutes at 100° C. and 60 mm. Hg pressure. The vacuum was broken, the moderate $N_2$ sweep was resumed and the polyol was cooled to 70° C. 0.01 weight percent (.073 grams) stannous octoate catalyst was then introduced by microsyringe and blended into the polyol. Next, 231.0 grams of 4,4'-methylene-bis-(cyclohexylisocyanate), Hylene W (du Pont), was added, and the reactants were heated to 100° C. The reaction temperature was maintained at 100° C. for 5 hours. The product prepolymer was diluted to 77% solids in moisture-free toluene, sampled for isocyanate analysis and cooled to 25° C. Based upon the isocyanate analysis, the prepolymer was chain-extended with ethylene diamine at a stoichiometry of 1.05 equivalents isocyanate per equivalent of amine, the ethylene diamine being dissolved in about 819 grams methyl Cellosolve and about 328 grams of methanol. The chain-extender solution was added rapidly. The reaction mixture exothermed 15° C., from 25 to 40° C., and was stirred for 15 minutes at 40° C. The lacquer product was then warmed to 80° C. and held at 80° C. for 1 hour, after which it was cooled to 40° C. and discharged. The final solids content of this lacquer was 35% and the cosolvent composition in parts by weight was 16 toluene, 60 methyl Cellosolve and 24 methanol.

To 100 parts of this stable polyurethane lacquer were added .01 parts 85% phosphoric acid and 1.5 parts dimethylolurea. The mixture was blended and then warmed at 49° C. for 1 hour to completely dissolve the dimethylolurea. The formulated lacquer was colorless and nearly transparent. Its Brookfield viscosity at 75° F. was 68 poises.

Films were prepared from the lacquer both before and after the crosslinking additive and the acid were added. These films were tested in accordance with the procedure of Example 1 and the results were as shown in Table IV.

TABLE IV.—RESULTS OF EXAMPLES 5, 6, AND 7

| Additives | Example 5 | | Example 6 | | Example 7 | |
|---|---|---|---|---|---|---|
|  | None | DMEU and acid | None | DMEU and acid | None | DMU and acid |
| Tensile, p.s.i. | 4,685 | 6,710 | 7,015 | 5,315 | 3,370 | 995 |
| Elongation, percent | 660 | 590 | 395 | 400 | 610 | 165 |
| Modulus, p.s.i.: |  |  |  |  |  |  |
| 100% | 580 | 300 | 595 | 420 | 440 | 420 |
| 200% | 660 | 465 | 1,030 | 770 | 605 |  |
| 300% | 795 | 650 | 2,610 | 1,735 | 805 |  |
| 400% | 1,175 | 1,165 | 6,550 | 5,315 | 1,110 |  |
| 500% | 2,110 | 3,110 |  |  | 1,630 |  |
| 600% | 3,700 |  |  |  | 2,585 |  |
| Tear, p.l.i. | 415 | 280 | 350 | 260 | 260 | 70 |
| Softening range, ° C. | 150-156 | 209-218 | 160-170 | 179-202 | 123-145 | 200 |
| Softening temp., ° C. | 150 | 209 | 160 | 179 | 123 | 200 |
| Fusion temp., ° C. | 156 | 218 | 170 | 202 | 145 | 200 |

What is claimed is:

1. An improved thermosetting polyurethane lacquer comprising:
    (a) an isocyanate terminated polyurethane prepolymer prepared from a polyester polyol and a diisocyanate, wherein the prepolymer is chain extended;
    (b) a suitable solvent system;
    (c) a crosslinking amount of a compound selected from the group consisting of dimethylolurea and dimethylolethyleneurea;
    (d) .003 to .03 parts by weight of phosphoric acid per 100 parts of chain extended prepolymer and solvent system.

2. The lacquer of claim 1 wherein the polyol is a polylactone polyol.

3. The lacquer of claim 1 wherein the polyester polyol is prepared from ethylene glycol, propylene glycol, and adipic acid.

4. The lacquer of claim 1 wherein the diisocyanate is selected from the group consisting of aliphatic and aromatic diisocyanates.

5. The lacquer of claim 1 wherein the diisocyanate is selected from the group consisting of 4,4'-methylene-bis(cyclohexylisocyanate) and tolylene diisocyanate.

6. The lacquer of claim 1 wherein the prepolymer is chain extended with a compound selected from the group consisting of diols, diamines, and mixtures thereof.

7. The lacquer of claim 1 wherein the prepolymer is chain extended with a diamine selected from the group consisting of ethylene diamine, isophorone diamine, and mixtures thereof.

8. The lacquer of claim 1 wherein the prepolymer is chain extended with a mixture of a diamine and a diol.

9. The lacquer of claim 1 wherein the diamine is ethylene diamine and the diol is 1,4-butanediol.

10. The lacquer of claim 1 wherein the solvent system contains solvents selected from the group consisting of toluene, methyl Cellosolve, dimethyl formamide, methanol, isopropanol, methylethylketone, and water.

11. The lacquer of claim 1 wherein the solvent system is selected from the group consisting of toluene and methyl Cellosolve; dimethyl formamide and methanol; methyl Cellosolve, methanol, and toluene; dimethyl formamide; and methyl Cellosolve.

12. The lacquer of claim 1 wherein the solvent system consists of methyl Cellosolve, methanol, and toluene.

13. The lacquer of claim 1 wherein the crosslinking compound is dimethylolurea.

14. The lacquer of claim 1 wherein the crosslinking compound is dimethylolethyleneurea.

References Cited

UNITED STATES PATENTS

| 3,644,233 | 2/1972 | Traubel | 260—2.5 AY |
| 3,715,326 | 2/1973 | Traubel | 260—2.5 AY |
| 3,446,771 | 5/1969 | Matsubayashi | 260—32.6 NR |
| 2,692,874 | 10/1954 | Langerak | 260—77.5 AB |
| 2,692,873 | 10/1954 | Langerak | 260—77.5 AB |

FOREIGN PATENTS 1,210,691  10/1970  Great Britain.

ALLAN LIEBERMAN, Primary Examiner

P. R. MICHL, Assistant Examiner

U.S. Cl. X.R.

260—32.6 NR, 32.8 N, 33.2 R, 33.4 UR, 33.6 UB

UNITED STATES PATENT OFFICE
CERTIFICATE OF CORRECTION

Patent No. 3,813,361　　　　　　　　　　　Dated May 28, 1974

Inventor(s) Marina N. Gillis & Michael P. Mazzeo

It is certified that error appears in the above-identified patent and that said Letters Patent are hereby corrected as shown below:

Column 10, line 74 (Claim 9) should read as follows:
-- 9. The lacquer of Claim 8 wherein the diamine is ethylene diamine and the diol is 1,4-butanediol. --.

Signed and sealed this 12th day of November 1974.

(SEAL)
Attest:

McCOY M. GIBSON JR.　　　　　　　C. MARSHALL DANN
Attesting Officer　　　　　　　　Commissioner of Patents